US008973298B2

(12) United States Patent
Thorne

(10) Patent No.: US 8,973,298 B2
(45) Date of Patent: Mar. 10, 2015

(54) BLADED FISHING LURE ASSEMBLY

(76) Inventor: David L. Thorne, Kaysville, UT (US)

( * ) Notice: Subject to any disclaimer, the term of this patent is extended or adjusted under 35 U.S.C. 154(b) by 434 days.

(21) Appl. No.: 12/387,024

(22) Filed: Apr. 27, 2009

(65) Prior Publication Data

US 2009/0211145 A1 Aug. 27, 2009

Related U.S. Application Data

(63) Continuation-in-part of application No. 11/656,099, filed on Jan. 22, 2007, now abandoned.

(51) Int. Cl.
*A01K 85/00* (2006.01)
*A01K 85/14* (2006.01)
*A01K 85/16* (2006.01)
*A01K 85/18* (2006.01)
*A01K 85/01* (2006.01)

(52) U.S. Cl.
CPC .................. *A01K 85/00* (2013.01); *A01K 85/14* (2013.01); *A01K 85/16* (2013.01); *A01K 85/18* (2013.01); *A01K 85/01* (2013.01)
USPC ........................................................ 43/42.15

(58) Field of Classification Search
CPC ........ A01K 85/00; A01K 85/01; A01K 85/14; A01K 85/16; A01K 85/18
USPC ..................... 43/42.29, 42, 42.5, 42.35, 42.11
See application file for complete search history.

(56) References Cited

U.S. PATENT DOCUMENTS

| 1,870,767 | A | * | 8/1932 | Brown | 43/42.29 |
|---|---|---|---|---|---|
| 2,522,179 | A | * | 9/1950 | Jensen, Sr. et al. | 43/42.22 |
| 2,569,792 | A | * | 10/1951 | Wilson | 43/42.4 |
| 2,570,338 | A | * | 10/1951 | Gambill | 43/42.35 |
| 2,618,096 | A | * | 11/1952 | Wagner | 43/42.47 |
| 2,979,848 | A | * | 4/1961 | McConnell | 43/37 |
| 3,159,940 | A | * | 12/1964 | Bokun | 43/35 |
| 3,284,945 | A | * | 11/1966 | Kurtis | 43/44.2 |
| 3,405,475 | A | * | 10/1968 | Ross | 43/42.08 |
| 4,016,671 | A | * | 4/1977 | Larsen | 43/42.17 |
| 4,453,333 | A | | 6/1984 | Olson | |
| 4,536,986 | A | * | 8/1985 | Stout | 43/42.27 |
| 4,641,455 | A | * | 2/1987 | Johnson | 43/42.13 |
| 4,718,191 | A | * | 1/1988 | Gentry | 43/42.13 |
| 4,790,101 | A | * | 12/1988 | Craddock | 43/42.37 |
| 5,412,899 | A | * | 5/1995 | Reboul | 43/42.13 |
| 5,446,991 | A | * | 9/1995 | Brackus | 43/42.37 |
| 5,857,283 | A | * | 1/1999 | Perrick | 43/42.5 |
| 5,887,378 | A | * | 3/1999 | Rhoten | 43/42.03 |
| 6,185,857 | B1 | * | 2/2001 | Hnizdor | 43/42.11 |
| 6,374,535 | B1 | * | 4/2002 | Bailey | 43/42.11 |
| 7,197,846 | B1 | * | 4/2007 | Gibson | 43/42.11 |
| 7,360,335 | B2 | * | 4/2008 | Edwards | 43/42.13 |
| 7,908,787 | B2 | * | 3/2011 | Finley | 43/36 |

(Continued)

*Primary Examiner* — Valentina Xavier

(57) ABSTRACT

A fishing lure assembly is disclosed which comprises a blade free to oscillate, yaw and produce a trailing wake as the fishing lure assembly is displaced through water. A weight is affixed to the fishing lure assembly, but inferiorly disposed such that the blade is free to oscillate and have a yaw divergence which is substantially unaffected by inertia of the weight. The fishing lure may be variably constructed to include one or more hooks and soft bait and hard bait bodies which are disposed to follow behind in the trailing wake. In one embodiment, a float is added to the lure assembly. In another embodiment, a combination of a frame and blade is disclosed, the blade being flexible and resilient and affixed to the frame such that the blade is securably affixed but replaceable in a fishing environment.

2 Claims, 11 Drawing Sheets

(56) References Cited

U.S. PATENT DOCUMENTS

| | | | |
|---|---|---|---|
| 8,028,465 B1* | 10/2011 | Wuensch et al. | 43/42.47 |
| 8,347,547 B1* | 1/2013 | Houdek | 43/42.13 |
| 2001/0045048 A1* | 11/2001 | Johnson | 43/42.39 |
| 2005/0086849 A1* | 4/2005 | Perrick | 43/42.47 |
| 2005/0210731 A1* | 9/2005 | Davis | 43/42 |
| 2005/0246940 A1* | 11/2005 | Jones et al. | 43/42.5 |
| 2007/0199234 A1* | 8/2007 | Davis | 43/42.47 |
| 2012/0023805 A1* | 2/2012 | Thorne | 43/42.53 |

* cited by examiner

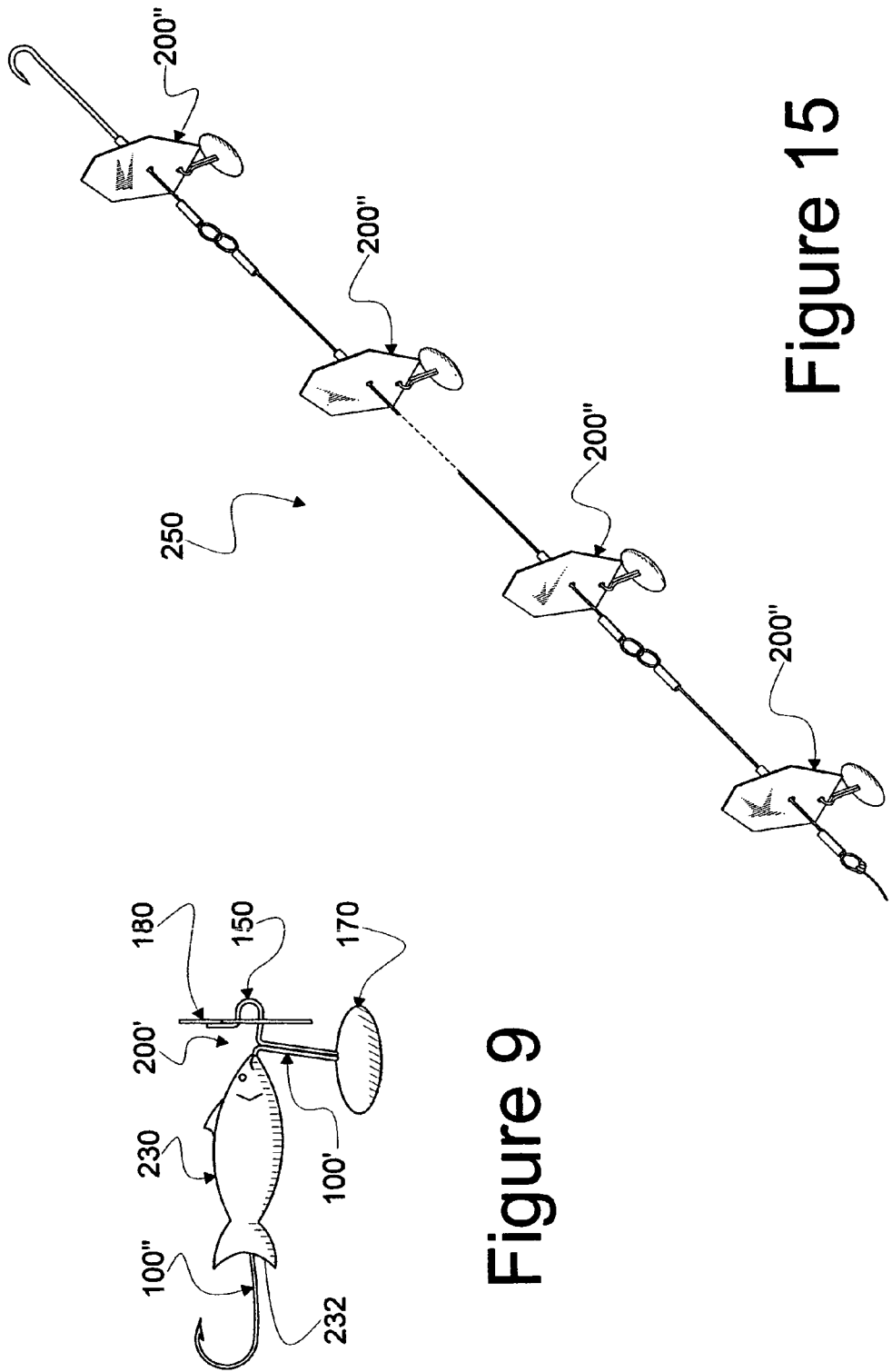

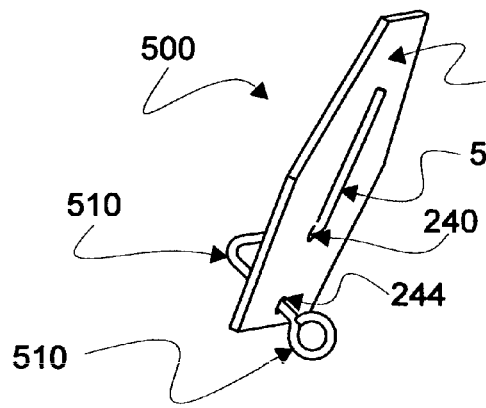
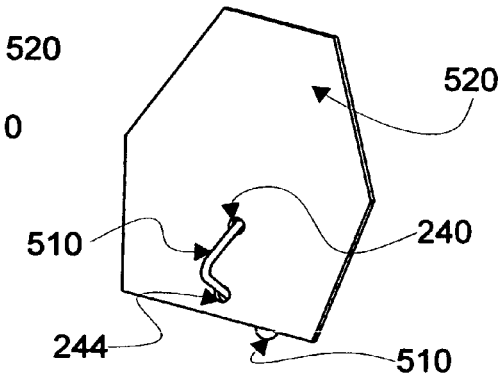
Figure 24  Figure 25
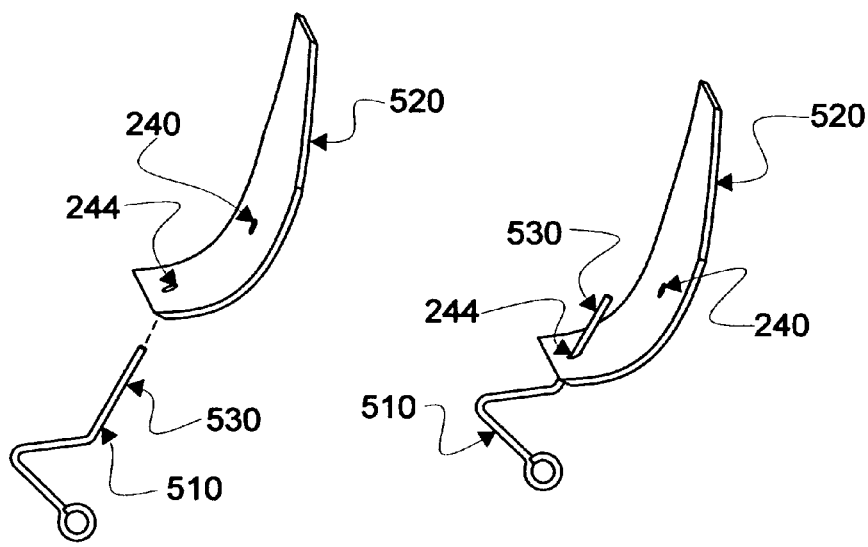
Figure 26  Figure 27

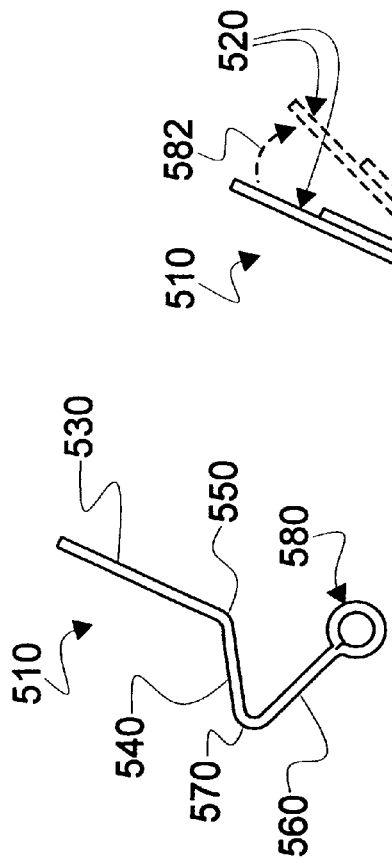
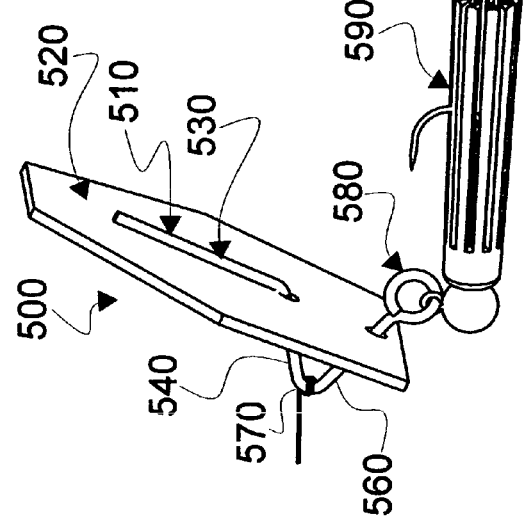

BLADED FISHING LURE ASSEMBLY

CONTINUITY

This application is a Continuation-in-Part of U.S. patent application Ser. No. 11/656,099, titled FISHING LURE ASSEMBLY and filed Jan. 22, 2007 by David L. Thorne. Currently, election of U.S. patent application Ser. No. 11/656, 099 relies specifically upon the species seen in FIGS. 10-12 of this application.

FIELD OF INVENTION

This invention relates to weighted assemblies from which fishing lures or other fishing gear may be assembled, and particularly assemblies which comprise an oscillating blade affixed to a trailing portion of a lure which is actuated by movement of the blade through water.

BACKGROUND AND RELATED ART

Fishing lures for jigging are well known in fishing art. Such lures are generally made by casting or otherwise enveloping a shank of a hook with a weighted (usually metal) body. Examples of such lures are disclosed in U.S. Pat. No. 4,453, 333 issued Jun. 12, 1984, to Robert W. Olson (Olson). Olson also discloses a generally convex blade to which a lure may be affixed to provide kite-like action of the blade as the lure is propelled through water. As shown in FIGS. 1-4, a weighted lure affixed to the blade derives a gentle swaying motion from the blade as the lure is retrieved through water.

A snag resistant fishing lure is disclosed in U.S. Patent Application Publication Number US 2005/0210731, published Sep. 29, 2005 on behalf of James Ronald Davis (Davis). Davis discloses a jig with an attached blade. The jig has a weight molded about the shank of a hook with an eyelet disposed to maintain the sharpened point of a hook held upright by the relative dispositions of the eyelet, weight and orientation of the point. The blade is taught to be affixed to the eyelet and be limited in oscillation by either collision of the blade with the eyelet or with the weight.

Lures made according to Olson or Davis generally provide an oscillatory motion, the frequency of which is determined by interaction between a blade and an associated weight. Due to the mass of the weight, frequency of oscillation of such blades are considerably lower than frequency of a blade which may freely oscillate without hindrance from a closely attached weight.

Many other forms of weighted hooks (jigs) are commonly found in commerce.

DEFINITIONS

For purposes of this disclosure the following definitions apply:

ballast, n, a heavy material used to stabilize a lure in water blade, n, a broad flattened part which is affixed to a portion of a fishing lure and which oscillates as the lure is propelled in water to provide a wake following therefrom; such a blade may be rigid or flexible, if flexible such a blade requires a supporting mast to withstand pressure from being displaced through water distal, adj, (see also proximal) indicates the segment of a device normally away from a line attachment of a lure dorsal, adj, refers to a portion of a lure which relates to the dorsal portion of a swimming fish fishhook, n, a device, usually made of rigid metal wire, comprising a curved section which has a sharpened point on one end for catching a fish and a shank which comprises a substantially straight portion on an opposite end. Generally, the shank is ultimately affixed to an eyelet or other attachment providing for connecting line and other accouterments the fishhook fulcrum, n, a support upon which a lever turns, as used herein, a weight forms the fulcrum and the lever is an elongated tether which affixes the weight to the rest of the assembly made according to the instant invention disclosed herein inferior, adj, situated lower down or closer to the center of the earth than a referenced site jig, n, a fishhook which has a weight affixed about the associated shank of the fishhook levity, n, a positive property of lightness to gravity which affects sinking characteristics (in water)

longitudinal axis, n, a medially disposed straight line through a lure part about which the lure part rotates mast, n, a long slender structure which is part of a lure frame and which provides support for a flexible blade proximal, adj, indicates the segment of a device normally closely disposed relative to a line attachment of a lure shank, n, a wire form which is a proximal portion of a fishhook the shank usually having a substantially straight portion which is associated with a curved portion of a fishhook or with a connecting link of multiple assembly fishing gear superior, adj, situated higher up or away from the center of the earth relative to a referenced site tether, n, an elongated length of material by which a weight is affixed to the rest of an assembly made according to the instant invention disclosed herein wake, n, track of liquid disturbance or turbulence left directly behind a specified lure part as that part is displaced through water ventral, adj, (opposite if dorsal) generally referring to the inferior side of a swimming fish yaw, n, to deviate erratically side-to-side from a course determined by pulling of a fishing line yaw divergence, n, distance lure diverges orthogonally from direction of pull by a fishing line

BRIEF SUMMARY AND OBJECTS OF THE INVENTION

In brief summary, this novel invention provides bases for assembling and fabricating lures or other forms of fishing gear. Generally, the resulting assemblies each comprise a rigid frame to which a blade is loosely affixed to oscillate when the assembly is drawn through water by a fishing line affixed to the frame at a site on a proximal side of the blade. The frame is also affixed to a forward attachment site of a lure part distally disposed relative to the blade. The site whereat the fishing line is affixed defines a first horizontal plane and the forward attachment site of the lure part is associated with a longitudinal axis of the lure.

In specific embodiments, the lure part is disposed in the wake of the blade and therefore directly affected by yaw divergence resulting from blade oscillation. Further, in these embodiments, a weight, which may be affixed to the rest of the assembly a plurality of ways, has a center of gravity which is distally disposed relative to the blade. The uppermost portion of the weight defines a third horizontal plane, the third horizontal plane being inferiorly disposed relative to the first horizontal plane and to the longitudinal axis of the lure. So disposed, the weight determines orientation of the assembly in water and effectively acts as a stabilizing fulcrum as the assembly is retrieved through the water while being relatively ineffective in determining frequency of oscillation of the blade, yaw divergence of the blade and each associated trailing portion. Examples of these embodiments providing illustrations of modes of connecting the weight to the rest of the assembly are provided in detail hereafter.

As a weight provides a stabilizing ballast, when displaced away from the blade and associated wake, sideways action and yaw divergence of the blade and other trailing parts of an associated lure or other fishing gear which are affected by blade action are likewise displaced angularly sideways. Yaw and yaw divergence of the blade and associated lure or other fishing gear, so attached are relatively independent from inertia associated with the weight. The weight, being so separated from the blade and other associated lure or other fishing gear, simply acts as a stabilizing fulcrum. Thus, oscillating action of the blade and associated yaw and yaw divergence directly affects each trailing part which, being so disposed, is not severely depressed by the weight. For this reason, a following shank (and a fishhook and other associated lure bodies) is free to move side-to-side with a yaw divergence which is much greater at a given frequency of blade oscillation than similar shanks of lures made according to Olson, Davis or other jigs where the weight is directly affixed to a shank (e.g. of a fishhook) and disposed in a line therewith.

In the current invention associated with these embodiments, lure parts, disposed to follow the blade in its wake, may comprise a fishhook or a lure body affixed to a fishhook. As the fishhook and lure body are generally much lighter than the weight, sideways action of the blade is readily communicated to the fishhook and lure body.

In one of these embodiments, the weight is not directly affixed to the blade. In such cases, a less robust and more easily breakable blade may be used without stresses of the weight bearing directly on the blade.

Further, a plurality of the assemblies of these embodiments may be joined serially to form a uniquely actuated, self weighted, elongated multi-blade spinner or trolling gear-like fishing apparatus.

In another of these embodiments, a buoyant member (a float) may be superiorly affixed to a frame of the assembly above an attached fishhook or lure body to affect total levity of the associated lure. In this embodiment, the buoyant member may be a float affixed superiorly to a frame of the lure assembly in the same manner that the associated weight is affixed, i.e. in a manner which does not significantly affect blade oscillation, but which acts against sinking forces of the weight to make the lure more buoyant in water.

Thus, it is a principle object to provide at least one embodiment of a lure assembly comprising a blade which oscillates when retrieved through water and lure warts affixed thereto, which follow in the wake of the blade and are displaced by blade oscillation and yaw divergence, and an inferiorly disposed weight, such that oscillating sideways action of the blade is freely communicated to the lure parts, the oscillating frequency and yaw divergence of which is relatively unaffected by the inertia of the weight.

It is an important object to provide at least one embodiment of a lure assembly with a fishhook as a lure part where the fishhook is disposed to follow the blade in the wake thereof, whereby side-to-side oscillatory action of the fishhook is directly a result of side-to-side vibratory actuation and yaw of the blade, the divergence of which is relatively unaffected by inertia of the weight.

It is another important object to provide a lure body, affixed to the fishhook, to form a covered hook lure having an action directly communicated from actuation and yaw of the blade and relatively unaffected by inertia of the weight.

It is yet another important object to provide an assembly comprising a rigid, hard-bait lure disposed between the blade and a fishhook whereby oscillation and resulting yaw divergence of the blade communicates vibratory motion to the rigid lure, the frequency of oscillation and yaw divergence being relatively independent from inertia of a weight affixed thereto.

It is still another important object to provide an elongated chain of serially linked assemblies to form an elongated multi-blade trolling gear array.

It is a primary object to provide a buoyant member superiorly affixed to a lure assembly made according to the instant invention thereby affecting total buoyancy of the associated lure.

Another related, but different embodiment of a fishing lure comprises two parts comprising a flexible, oscillating blade part and an angulated and substantially rigid frame part. In combination, the blade part is sufficiently flexible and resilient to permit the blade to be assembled about or separated from the angulated and rigid frame to thereby permit a change of blades upon the frame in a fishing environment. This blade characteristic is quite different from conventional oscillating blades which are commonly formed of rigid material which permits use in fishing environments without supporting members.

The frame part comprises a vertical mast which is medially disposed on distal side of the blade when assembled in combination with the blade to provide support and maintain vertical disposition of the flexible blade against rigors of fishing as the blade is displaced through water. In addition, the frame part comprises an angulated structure inferior to the mast which is bent to provide an arduous pathway over which the blade is threaded for secure engagement upon the frame, once so disposed. Once mounted on the frame, angulation of the frame and relaxation of the blade to its substantially original form keeps the blade securely affixed thereto. The blade only requires two holes through which the frame and associated mast is inserted for connection and is sufficiently flexible to permit such attachment of blade to frame. Generally, in this manner, a flexible blade may be made from a clear pliable plastic, such as mylar or polyester. Also, blade oscillation is unencumbered by a weight which may be affixed to the frame for fishing level and luer stability control.

It is preferred that the angle of the mast relative to the rest of the frame be adjustable by bending of the mast relative to the rest of the frame and relative to a fishing line connection to provide for varying the angle of attack and subsequent control of fishing level of the blade and associated lure in water. For this reason it is recommended that the frame be made of such metals as stainless steel or titanium.

It is therefore another object to provide a combination blade and frame for a fishing lure whereby the blade is removable and replaceable when fishing.

These and other objects and features of the present invention will be apparent from the detailed description taken with reference to accompanying drawings.

BRIEF DESCRIPTION OF THE DRAWINGS

FIG. 9 is a side elevation of the lure assembly seen in FIG. 5 with a hard bait lure affixed thereto.

FIG. 15 is a perspective of a plurality of lure assemblies similar to the lure assembly seen in FIG. 14, serially assembled to provide a multi-blade trolling gear.

FIG. 24 is a perspective of a distal side of a frame and blade combination made according to an instant invention disclosed herein.

FIG. 25 is a perspective of the proximal side of the combination seen in FIG. 24.

FIG. 26 is an exploded view of the combination seen in FIG. 24, with the blade bent for installing the blade to the frame.

FIG. 27 is a perspective, of the combination seen in FIG. 26, wherein a mast of the frame is being inserted through a hole in the blade.

FIG. 28 is a side elevation of the frame seen in FIG. 26.

FIG. 29 is a side elevation showing a first view of the combination of mast of the frame and blade in solid lines, wherein the mast of the frame is providing support for the blade in one angular orientation and a second view of the mast and blade in dashed lines, wherein the mast is rotated to provide support for the blade in a second angular orientation.

FIG. 30 is a perspective of the combination seen in FIG. 24 with a fishing lure and hook affixed thereto.

DETAILED DESCRIPTION OF THE ILLUSTRATED EMBODIMENTS

Reference is now made to the embodiments illustrated in FIGS. 1-30 wherein like numerals are used to designate like parts throughout. Primes of numbers, otherwise used without primes for designating a part, label parts which are similar in form and function, but not identical, to those parts designated by the numbers without primes.

Figure 1:
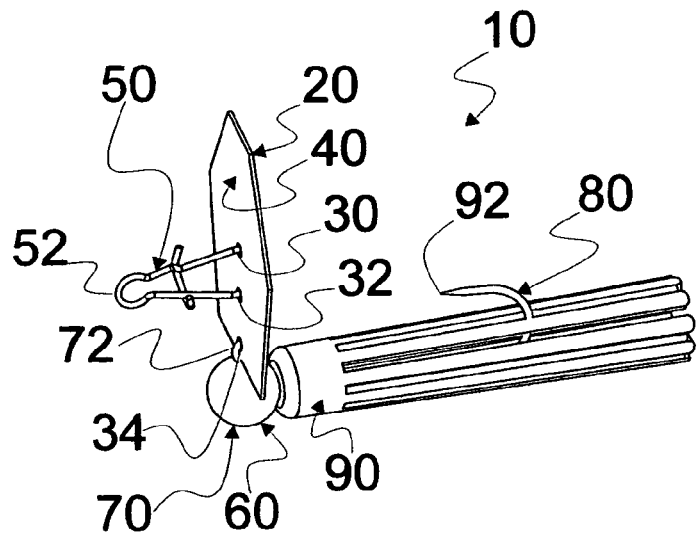
FIG. 1 is a perspective of a PRIOR ART lure.
Figure 2:
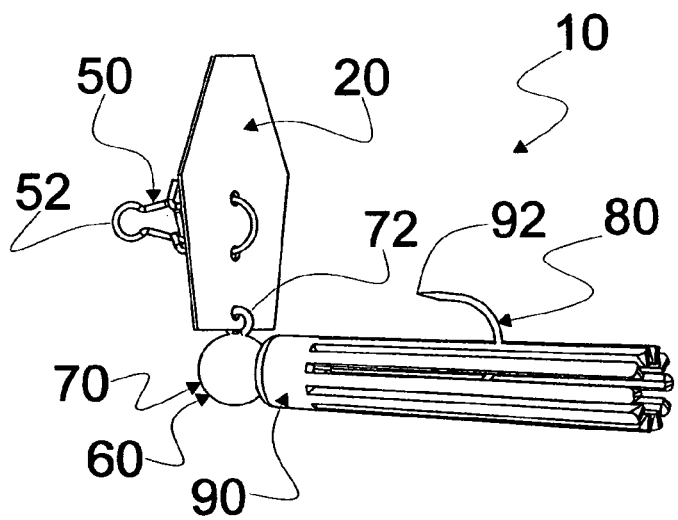
FIG. 2 is a perspective of the lure seen in FIG. 1 viewed at a different angle.

Reference is now made to FIGS. 1 and 2 wherein representations of a lure 10 similar to a lure disclosed in Davis is seen. As seen in FIG. 1, lure 10 comprises a blade 20 having three holes 30, 32 and 34 distributed across the face 40, thereof. A clip 50 is affixed to blade 40 through medially disposed holes 30 and 32. Though not shown, a fishing line may be affixed to a proximal loop 52 to retrieve lure 10 through water while fishing.

A weight assembly 60 comprising a weight 70 and an eyelet 72 is affixed to blade 20 via hole 34. Securely affixed to weight 70 is a fishhook 80 which, further, is affixed to a dressing or lure cover 90. As may better be seen in FIG. 2, hook 80 is securely affixed to weight 70 and is therefore uprightly disposed such that a pointed end 92 of fishhook 80 is dorsally disposed to formulate a claimed snag-free arrangement. Note particularly, that fishhook 80 is securely affixed and directly in line with weight 70 such that motion of fishhook 80 and associated yaw divergence is directly affected by inertia of weight 70.

Figure 3:
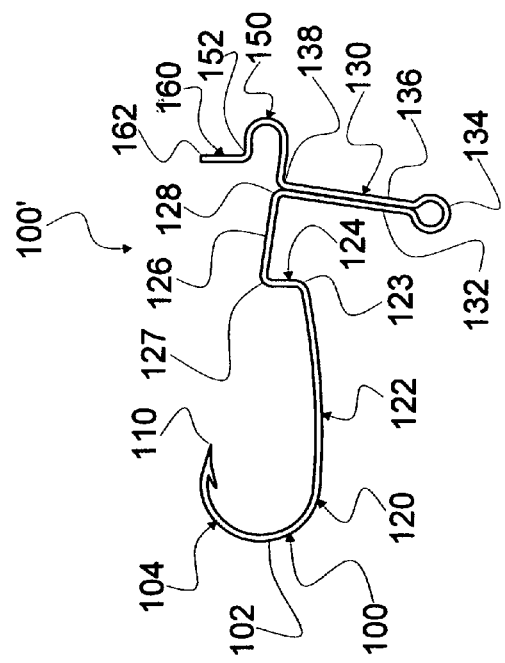
FIG. 3 is a side elevation of an embodiment of a fishhook frame made according to the instant invention disclosed herein.
Figure 6:
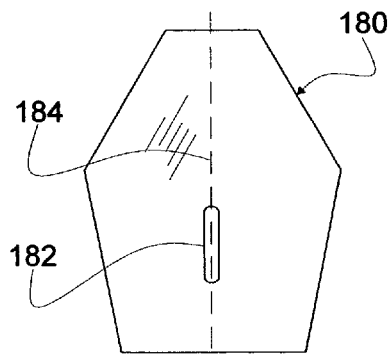
FIG. 6 is a plane view of the blade seen in FIG. 5.

Reference is now made to FIGS. 3-9 wherein a first embodiment of the instant invention disclosed herein is seen in various aspects. In FIG. 3, a fishhook 100, which is one continuous, sturdy wireform frame 100', is seen. At a distal end 102, frame 100' comprises a curved section 104 which rises dorsally to a point 110. Proximally contiguous with section 104, frame 100' comprises a bent shaft 120 (although shaft 120 may be formed in many ways consistent with the instant invention.) Shaft 120 therefore comprises a distal elongated, substantially horizontal section 122 contiguously affixed to an upwardly distending section 124 at a bend 123. Section 124 is further contiguously affixed to another proximally distending section or segment 126 at a bend 127. Section 126 (and shaft 120) is abruptly terminated proximally at a bend 128.

Contiguous at bend 128 another section of frame 100' is inferiorly disposed to provide a tethering segment 130. Segment 130 comprises an inferiorly distending segment 132 contiguously affixed to an attachment loop 134 which is contiguously affixed to a superiorly distending segment 136. Segment 136 is ended at a bend 138. From bend 138, wireform 100' has a proximally distending segment 140 which continues to form a loop 150. Superiorly loop 150 ends at a bend 152 wherefrom a superiorly disposed segment 160 distends upward to a butt end 162.

Figure 4:
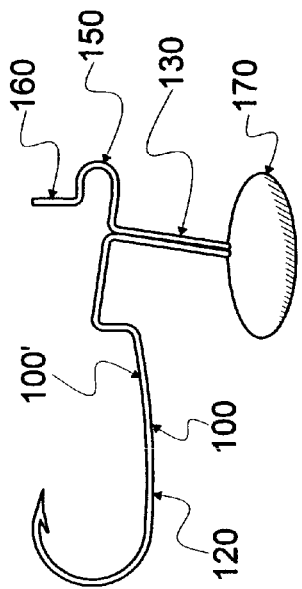
FIG. 4 is a side elevation of the fishhook frame seen in Figure with a weight affixed thereto.

As seen in FIG. 4, a weight 170 is affixed (preferably molded) about an inferior portion of segment 130 (otherwise not numbered) and loop 134 of tethering segments 132 and 136 to affix weight 170. Weight 170 may be any material which may be securely affixed about loop 134, the material being heavy relative to other parts of an associated fishhook 100 (and density of water) and all other parts of an associated lure assembly made according to the invention disclosed herein. Note, this may permit segment 130 to be disposed above weight 170 in water.

Figure 5:
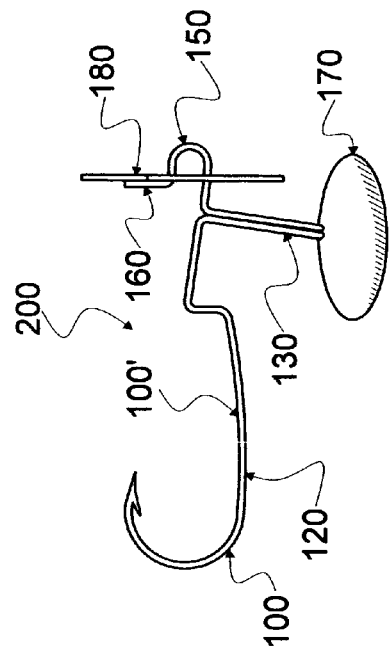
FIG. 5 is a side elevation of the fishhook frame and weight seen in FIG. 4 with a blade affixed to the fishhook to produce a basic fishing lure assembly.

FIG. 5 shows an embodiment of a lure assembly made according to the instant invention disclosed herein. A blade 180 (which is seen in better detail in FIG. 6) is disposed about loop 150. Blade 180 may be loosely, yet securely affixed about loop 150 by tying a fishing line (not shown) or adding a clip (also not shown) to loop 150. Adding a fishing line or adding a clip is well known in the art of using fishing lures. With blade 180 so affixed, a fishing lure assembly 200 is complete.

So affixed, blade 180 is forced to be disposed, relative to direction of being retrieved through water, by angular disposition of superiorly disposed segment 160, against which blade 180 communicates when so retrieved. Also, by natural consequence of assembly motion in water, blade 180 oscillates. As weight 170 is displaced away from the rest of fishing lure assembly by length of tethering segments 130 and 136, inertia of weight 170 is relatively ineffective in determining frequency of blade 180 side-to-side oscillation and related yaw divergence. For this reason, blade 180 oscillation and effective resulting side-to-side vibratory or yaw motion and divergence of associated frame 100' (fishhook 100 and other lure components which may be added to attract fish) is much eater than would be the case if an attached weight were not so displaced away from fishhook 100 or other lure components.

Referring once more to FIG. 6, blade 180 is seen to comprise a medially disposed slot 182 sized and shaped for loop 150 insertion. Blade 180 is preferably symmetrical about a longitudinal midline (represented by dashed line 184) and otherwise asymmetric as is common practice in fishing lure blade art. Also, blade 180 may be planar, convex or concave.

Figure 7:
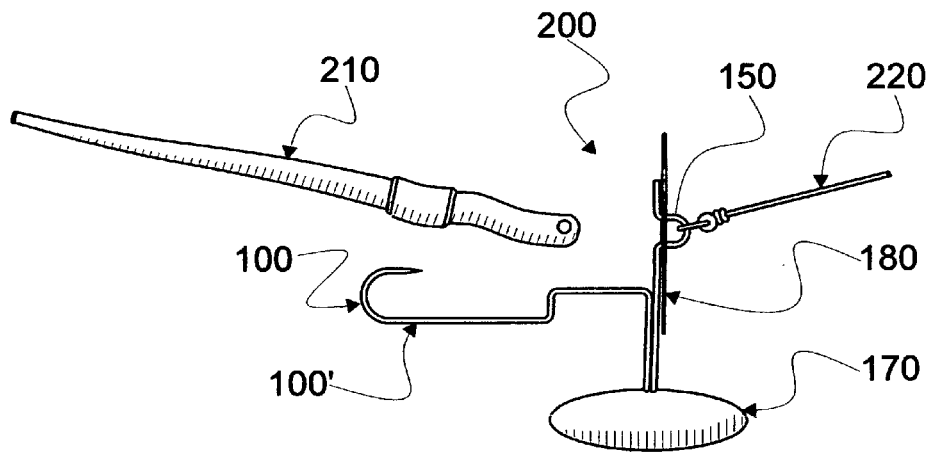
FIG. 7 is a side elevation of the basic fishing lure assembly seen in FIG. 5 with a soft bait lure disposed before attachment to a fishhook portion of the assembly.
Figure 8:
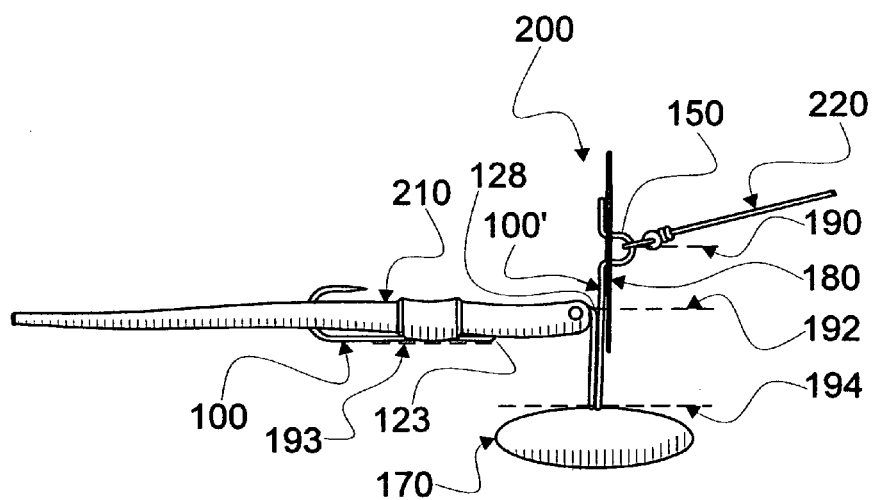
FIG. 8 is a side elevation of the lure assembly seen in FIG. 5 with the soft bait lure, seen in FIG. 7, affixed to the fishhook portion of the assembly.

As disclosed supra, other lure components, such as a soft bait lure 210 (seen unattached in FIG. 7), may be affixed to fishhook 100. It is for this reason that bends 123 and 127 are formed in frame 100' to provide upwardly distending section 124 which acts as an anchor for an attached soft bait (such as soft bait 210) as seen in FIG. 8. Note, that a fishing line 220 (seen in part) is knotted to loop 150 to loosely, but securely affix blade 180 to frame 100'. Also, as an important part of the instant invention, a first plane (as indicated by dashed line 190) may be distended from site of line 220 attachment. A longitudinal axis 192 of the trailing lure part (in this case represented by fishhook 100 and soft bait 210), synonymous with dashed line 192, may be considered to be extended from bend 128 of frame 100'. A second plane 193 is defined by the inferior side of lure 210. A third plane (as indicated by dashed line 194) may be subtended from an uppermost part of weight 170. Thus, it is a critical design criteria of the instant invention that the third plane 194 be inferiorly disposed to the first plane 190 and second plane 193, and therefor weight 170 is always inferiorly disposed in water below a site of an attached line and a longitudinal axis (and inferiorly disposed plane) of a lure part associated with frame 100.

Also, a hard bait, such as hard bait 230, may be affixed to a modified lure assembly 200' as seen in FIG. 9. Affixing such a hard bait to a wireform of a lure is well known in lure manufacturing art. In the case of lure assembly 200' and hard bait 230, a fishhook 100" is securely affixed to a tail section 232 of hard bait 230. So affixing fishhooks to a hard bait is well known in fishing lure manufacturing art.

It is important to note that in all cases seen in FIGS. 5-9, weight 170 is disposed out of alignment with line connecting loop 150 and other associated lure parts. A tethering part (sections 130, 132 and 136 in combination) forms a lever permitting weight 170 to act as a fulcrum, above which blade 180 and the rest of assembly 200 (or 200') and any associated bait part freely oscillates and therefore yaws markedly away from direction of fishing line pull.

Figure 10:
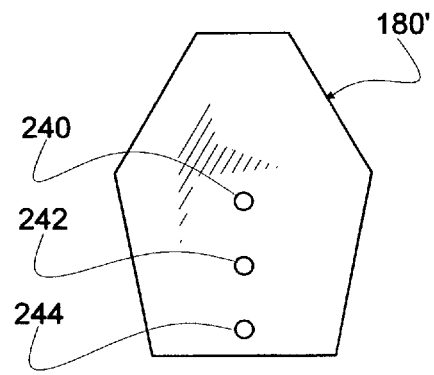
FIG. 10 is a plane view of a three hole blade assembly.
Figure 12:
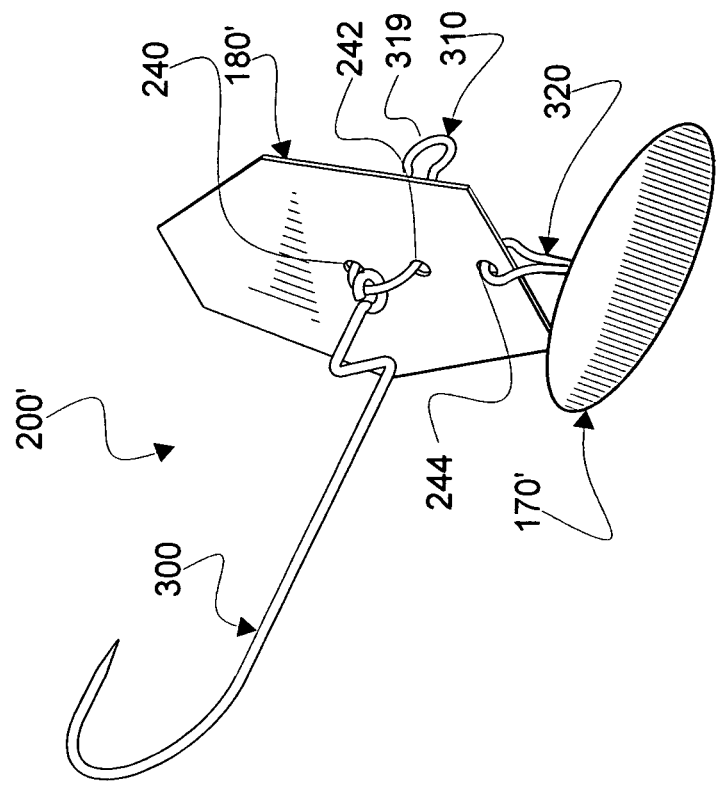
FIG. 12 is a perspective of an assembled lure assembly using, in part, the partially constructed lure assembly seen in FIG. 11.
Figure 11:
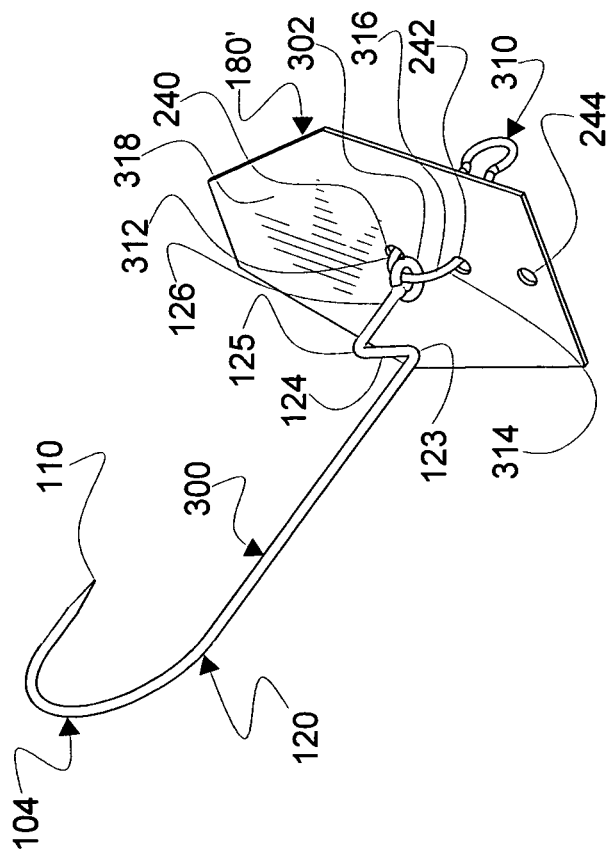
FIG. 11 is a perspective of a partially constructed lure assembly, being made according to the instant invention, with a clip used to affix a fishhook to the blade assembly seen in FIG. 10.
Figure 16:
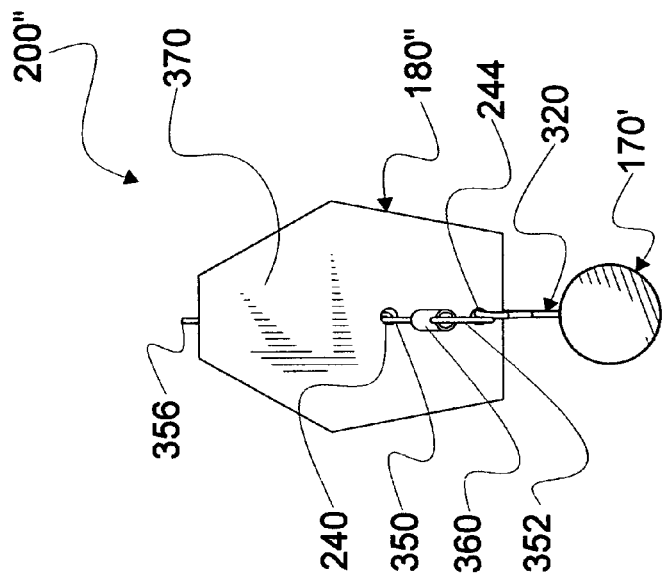
FIG. 16 is a perspective of a single lure assembly similar to the lure assembly of FIG. 14 where in sideways oscillation of the blade is depicted.

Reference is now made to FIGS. 10-12 wherein another embodiment of a lure assembly 200' made according to the present invention is seen (in FIG. 12). A blade 180' having three holes (numbered 240, 242, and 244) are similarly and respectively disposed to holes 30, 32 and 34 (see FIG. 1). Blade 180' is seen affixed to a fishhook frame 300. Distal segments 104-126 of fishhook frame 300 are substantially the same as distal segments 104-126 of fishhook 100. However, fishhook frame 300 comprises an eyelet 302 affixed to a proximal end of section 126.

Fishhook frame 300 is loosely, but securely affixed to blade 180' by a clip 310. Clips, such as clip 310, are commercially available. Clip 310 comprises a pair of legs 312 and 314 which are displaced through holes 240 and 242, respectively, providing a loop 316 on a distal side 318 and a loop 319 for affixing a fishing line on a proximal side of blade 180'. Eyelet 302 is affixed to loop 316 and thereby to blade 180'

As seen in FIG. 12, a tethering strap 320 is affixed to blade 180' via hole 244. Distally away from blade 180' strap 320 is affixed to a weight 170'. Strap 320 may be rigid or flexible. Note, using blade 180' as a structural connecting member to weight 170' requires that blade 180' have sufficient structural strength to manage drag and other forces placed upon weight 170' during fishing maneuvers without breaking.

Figure 13:
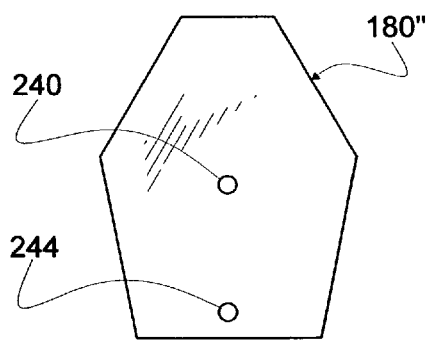
FIG. 13 is a plane view of a two hole blade assembly.
Figure 14:
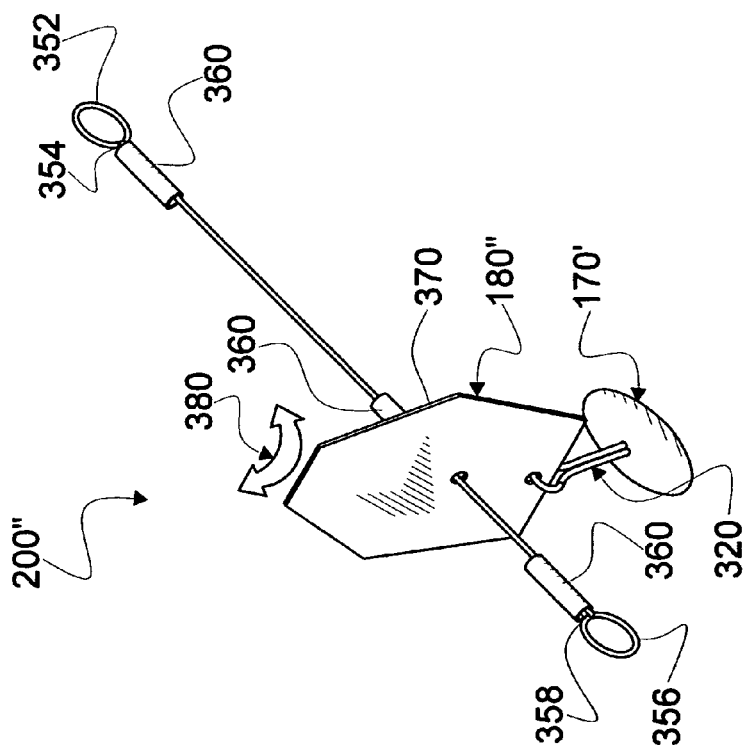
FIG. 14 is a front elevation of a lure assembly, made according to the instant invention disclosed herein, which utilizes the two hole blade assembly seen in FIG. 13.

Reference is now made to FIGS. 13-17 wherein parts and combinations of parts of a third embodiment, assembly 200", of the instant invention are seen. A two hole blade 180" is seen in FIG. 13. Blade 180" is similar in all respects to blade 180' except that blade 180" does not comprise a hole 242. As seen in FIG. 14, a weight 170' is affixed to blade 180" via a strap 320 disposed through hole 244, as is the case for connecting weight 170' to blade 180', as previously disclosed.

A connecting elongated shaft 350 is disposed to communicate through hole 240. Generally, though not universally, a connecting ring 352 is affixed to a distal end 354 of shaft 350 (which may be best seen in FIG. 16). Similarly, another connecting ring 356 may be connected at the proximal end 358 of shaft 350. At least one hollow, elongated spacer 360 is disposed along shaft 350 proximal to blade 180". Another hollow elongated spacer 360 and an associated bead (not seen in the figures, but well known in fishing art) is on a distal side 370 of blade 180" to retard distal displacement of blade 180" relative to shaft 350 and encourage sideways oscillation of blade 180". Double ended arrow 380 denotes side-to-side (sideways) oscillation yaw of blade 180" as assembly 200" is retrieved through water.

Figure 17:
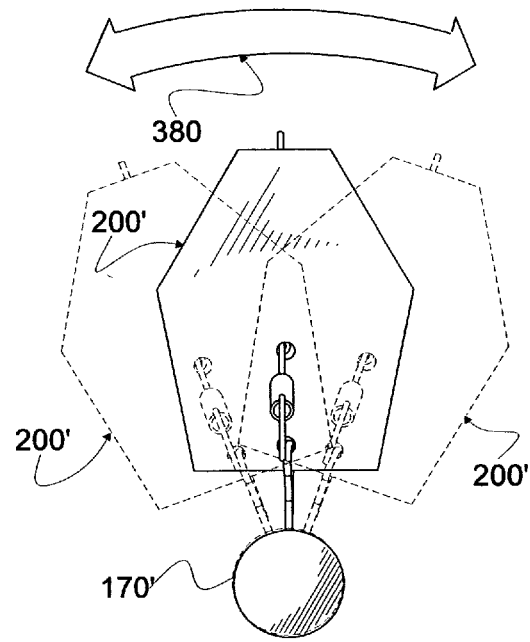
FIG. 17 is a frontal elevation of a single lure with dashed line presentation of angular oscillation depicting motion of the lure relative to a stabilizing weight.

Such sideways oscillation results in rocking of all parts of assembly 200', as indicated by arrow 380 in FIG. 17, about a tether affixed to weight 170' which acts as a fulcrum about which the rest of assembly 200" rocks. Also, it is this sideways oscillation, remote from a tethered weight which acts as a fulcrum, that provides the unique action of blades and lures made according to the instant invention disclosed herein.

As seen in FIG. 15, serially connecting a plurality of lure assemblies 200" to form a multi-lure assembly lure 250 which mimics trolling gear, but has a distributed weight which permits fishing deeper without adding a forward weight (not shown) to a lure.

As fish may reside at varying depths in a fishing environs, it is prudent to be able to controllably vary depth of a fishing lure. Of course, lure depth may be varied by altering speed of displacement of a lure through water, selecting a different mass or orientation of weight 170 or by adjusting blade orientation by changing tilt of superiorly disposed segment 160

(See FIG. 5). Yet, suspending of a lure can be achieved by adding a buoyant member (a float) to the lure. An example of such is seen in lure assemblies and lures illustrated in FIGS. 18-22.

Figure 18:
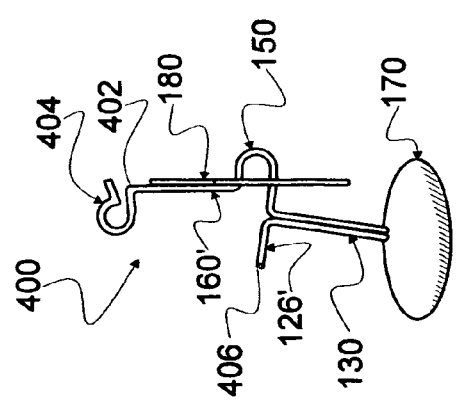
FIG. 18 is a side elevation of a lure assembly frame which is similar to the fishhook frame seen in FIG. 6, but without the fishhook portion.
Figure 21:
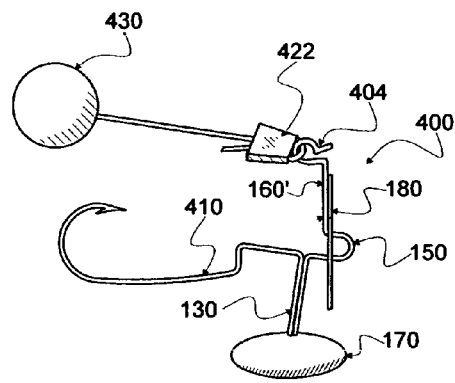
FIG. 21 is side elevation of the lure assembly seen in FIG. 19, but with a fishhook affixed thereto.

Referring to FIG. 18, a sturdy lure assembly frame 400, which is similar to an anterior portion of frame 100' (see FIG. 5) is seen. Those portions of frame 400 which differ from frame 100' are seen to be a superiorly disposed segment 160' and a proximally distending section 126'. Segment 160', like segment 160, is upwardly distending, but does not end abruptly at a butt end 162. Rather segment 160' extends upward to a site 402 whereat a portion of frame 400 is bent to form an attachment loop 404.

Note that segment 126' is abruptly terminated at a segment end 406. As will be disclosed hereafter, segment 126' may be extended to form a trailing fishhook 410, seen in FIG. 21 (similar to fishhook 100, see FIG. 3), or be bent to provide a loop attachment for a fishhook or an associated lure (not shown). Such modes of attachment of fishhooks and other lure parts are well known in fishing art. Note also that weight 170 is affixed to frame 400 in a manner similar to affixing weight 170 to fishhook 100 (as seen in FIGS. 4 and 5). Also note that a loop 150 is provided for connecting a fishing line as seen in FIGS. 7 and 8.

Figure 20:
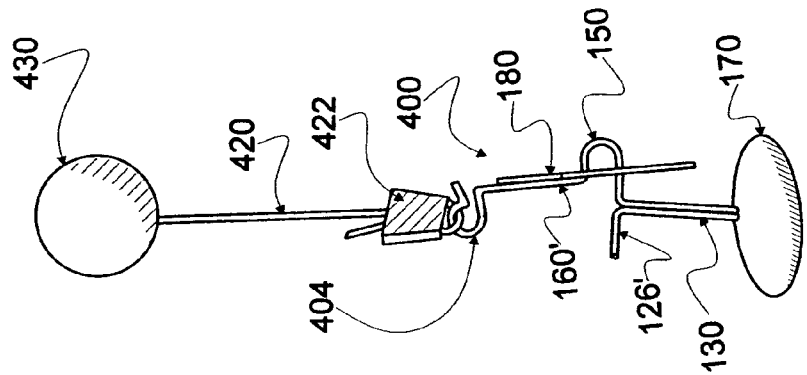
FIG. 20 is a side elevation of the lure assembly seen in FIG. 19, but with the buoyant member seen as being disposed when the lure assembly is still in water.
Figure 19:
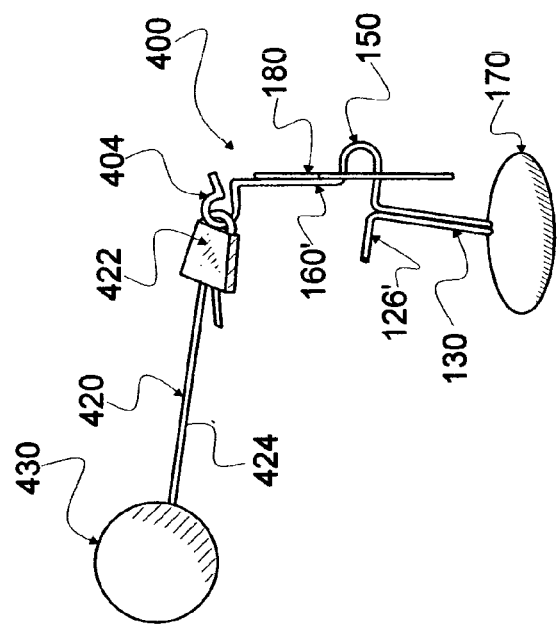
FIG. 19 is a side elevation of the lure assembly seen in FIG. 18, but with a buoyant member affixed thereto, the buoyant member being disposed as when the lure assembly is pulled through water.

As seen in FIG. 19, a float subassembly 420, is affixed to loop 404. Subassembly 420 is disposed in FIG. 19 to trail loop 404 when being drawn through water. Although other connections may be made between a rising segment or post (e.g. segment 160) within the scope of the instant invention, it is preferred that a connection between subassembly 420 and segment 160' be hinged. As may be seen in FIG. 19, subassembly 420 has a proximally disposed releasable clip 422 and an associated elongated member 424 which is distally terminated at site of attachment of a float 430. Float 430 is preferably hollow and sized to provide a predetermined upwardly directed force which offsets ballast of weight 170. Use of such a float provides depth control when moving and a desired stabilized posture when frame 400 is still in water, as seen in FIG. 20.

Of course, a fishhook or a lure may be affixed to or be contiguous with frame 400 to form a usable fishing lure. Note, as an example, fishhook 410 directly affixed to frame 400 in FIG. 21. Note also a hard bait lure 230 affixed to frame 400 in FIG. 22. These are simply examples of lure attachments which may be affixed to a basic frame 400 to form desired lure variations.

Figure 23:
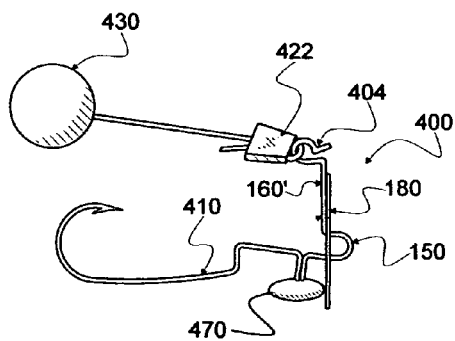
FIG. 23 is a side elevation of a lure assembly similar to the lure assembly seen in FIG. 21, but with a shortened tether to a weight which is displaced accordingly.

As should be well noted, stability of a lure 400 in water is critical for acceptable operation. While a weight (such a weight 470) as seen in FIG. 23, may be affixed to a lure with a short tether, weight 470 should always be disposed inferiorly relative to a fishing line attachment site, such as loop 150 and should be disposed to not interfere with action of the blade.

Reference is now made to FIGS. 24-30 wherein a combination 500 comprising a fishing lure frame 510 and associated oscillating blade 520 are seen securely joined. Note that blade 520 is similar to blade 180" seen in FIG. 13 having two holes 240 and 244. Frame 510 is more completely seen in FIG. 28. From a most superior position, frame 510 comprises an elongated mast 530 and a proximally extending segment 540, mast 530 and segment 540 being joined at a first bend 550. A segment 560 which is inferiorly disposed to segment 540 is joined to segment 540 by a second bend 570. Segment 560 is inferiorly truncated by a ring part 580 which is sized and formed for attaching a hook or other lure parts.

Generally blade 520 is sized and shaped to horizontally oscillate upon segments 540 and 560. To assemble and affix blade 520 upon frame 510, blade 520 may be bent, as seen in FIG. 26 such that mast 530 is inserted into hole 244. Once mast 530 is inserted through hole 244 as seen in FIG. 27, blade 520 is further bent to permit mast 530 insertion into hole 240. Blade 520 following a track formed by hole 244 traveling about segments 540 and 560 is then displaced to be securely affixed by segments 540 and 560, between holes 240 and 244, respectively, and mast 510. Note, as seen in FIG. 28, that mast 530 may be articulated, as indicated by example of arrow 582, about bend 550 to change angle of attack of blade 520 during displacement through water, thereby providing depth control for an associated lure. Note also, that a blade 520 may be removed by reversing assembling steps disclosed supra. In this manner, a blade 520 having different fish attracting characteristics may be facilely exchanged for one already disposed on frame 510.

It may be noted that proximally facing segments 540 and 560 and bend 570 provide connecting geometry for fishing line connection at bend 570, as seen in FIG. 29. Also, as seen in FIG. 29, a fishing hook and luer assembly may be affixed to ring 580.

Figure 22:
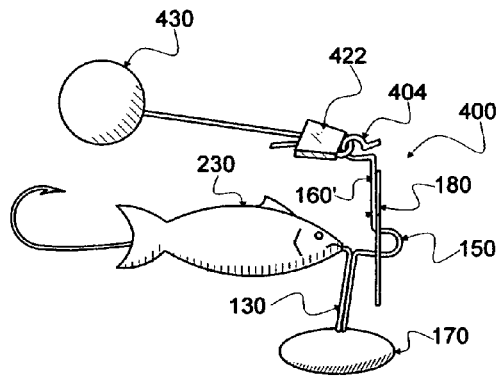
FIG. 22 is a side elevation of the lure assembly seen in FIG. 19 with a hard bait affixed thereto.

Within the scope of the invention, frames may be formed differently than frame 510, but within the scope of the invention such forms should include geometry which permits a supporting mast to be inserted through holes in a bent blade to form the inventive combination which securely engages the blade to the frame once assembled thereto. As an example, distal portions of a frame having segments 540 and 560 and mast 530 may be distally formed for weight attachment as seen in FIG. 3 or FIG. 4 or for affixing a hook and lure part as seen in FIG. 22. However, it is not likely that attachment of a weight to a blade may be accomplished as seen in FIG. 12 due to fragile nature of a blade made according to this invention (e.g. blade 520).

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A fishing lure comprising:
   a. a wire clip (310) comprising a pair of legs (312, 314), said legs being joined on a first end to comprise a first loop (316) whereby a fishhook frame (300) is loosely, but securely affixed thereto and being joined on a second end to comprise a second-loop (319) whereat a fishing line is affixed;
   b. a blade member (180') comprising a pair of centrally disposed holes (240,242) through which each of said legs are disposed and a third hole (244) disposed above an inferiorly disposed edge of said blade, but between the edge and pair of medially disposed holes;
   c. the fishhook frame (300) comprising an eyelet by which said frame is affixed to the first loop; and
   d. a weighted body (180') affixed to a tethering strap (320) whereby said weighted body is loosely, but securely affixed to said third hole of said blade which, in combination with force of water imposed upon said blade, maintains said blade in a vertically disposed state such that, as the lure is pulled through water, side-to-side oscillation of said blade imparts side-to-side motion to said centrally affixed fishhook frame through motion of said first loop.

2. The fishing lure according to claim 1, further comprising an artificial bait (210, 230) affixed to said fishhook frame to which is imparted a side-to-side motion.

* * * * *